United States Patent [19]

Varaprasad et al.

[11] Patent Number: 5,145,609

[45] Date of Patent: Sep. 8, 1992

[54] LINEAR POLYETHER-CONTAINING ELECTROCHEMICHROMIC SOLUTIONS AND RELATED DEVICES

[75] Inventors: Desaraju V. Varaprasad; Niall R. Lynam; Hamid R. Habibi; Padma Desaraju, all of Holland, Mich.

[73] Assignee: Donnelly Corporation, Holland, Mich.

[21] Appl. No.: 610,409

[22] Filed: Nov. 7, 1990

[51] Int. Cl.$^5$ .......................... G02F 1/00; G02F 1/01; G02B 5/23

[52] U.S. Cl. .................................. 252/583; 252/586; 359/272; 359/265

[58] Field of Search ....................... 252/583, 586, 582; 350/357; 359/265, 272

[56] References Cited

U.S. PATENT DOCUMENTS

| | | | |
|---|---|---|---|
| Re. 33,040 | 8/1989 | Kakiuchi | 252/586 |
| 2,632,045 | 3/1953 | Sziklai | 252/583 |
| 3,280,701 | 10/1966 | Donnelly et al. | 88/77 |
| 3,282,157 | 11/1966 | Jones et al. | 350/357 |
| 3,282,158 | 11/1966 | Jones et al. | 350/357 |
| 3,282,160 | 11/1966 | Jones et al. | 350/357 |
| 3,283,656 | 11/1966 | Jones et al. | 88/107 |
| 3,451,741 | 7/1969 | Manos | 350/357 |
| 3,453,038 | 7/1969 | Kissa et al. | 350/357 |
| 3,506,229 | 4/1974 | Schoot et al. | 350/357 |
| 3,652,149 | 3/1972 | Rogers | 350/357 |
| 3,692,388 | 9/1972 | Hall, Jr. et al. | 350/312 |
| 3,774,988 | 11/1973 | Rogers | 350/150 |
| 3,854,794 | 12/1974 | Van Dam et al. | 350/357 |
| 3,873,185 | 3/1975 | Rogers | 252/582 |
| 3,912,368 | 10/1975 | Ponjee | 350/357 |
| 4,090,782 | 5/1978 | Bredfeldt et al. | 350/357 |
| 4,093,358 | 6/1978 | Shattuck et al. | 350/357 |
| 4,139,276 | 2/1979 | Clecak et al. | 350/357 |
| 4,210,390 | 7/1980 | Yaguchi | 350/357 |
| 4,309,082 | 1/1982 | Kohara et al. | 350/357 |
| 4,750,816 | 6/1988 | Ito et al. | 350/357 |
| 4,752,119 | 6/1988 | Ueno et al. | 350/357 |
| 4,773,741 | 9/1988 | Inaba et al. | 350/357 |
| 4,844,591 | 7/1989 | Arribart et al. | 350/357 |
| 4,902,108 | 2/1990 | Byker | 350/357 |

FOREIGN PATENT DOCUMENTS

| | | |
|---|---|---|
| 0012419 | 6/1980 | European Pat. Off. . |
| 0147606 | 10/1985 | European Pat. Off. . |
| 0240226 | 10/1987 | European Pat. Off. . |
| 56-93742 | 6/1981 | Japan . |
| 56-93743 | 6/1981 | Japan . |
| 57-11325A | 1/1982 | Japan . |
| 566860 | 7/1977 | U.S.S.R. . |
| 328017 | 5/1930 | United Kingdom . |
| 1314049 | 4/1973 | United Kingdom . |

OTHER PUBLICATIONS

Ushakov et al.: "Electrochromism of Organic Compounds: Some Properties of Two-Electrode Cells", Electrokhimiya, vol. 14, (2) 319–322, Feb.

Kaufman "New Organic Materials for Use as Transducers in Electrochromic Display Devices", Conference Record of 1978 Biennial Display Research Conference, Oct. 24

Hirai et al., "Electrochromism for Organic Materials in Polymeric All

Shelepin et al, "Electrochromism of Organic Compounds II. Spectral and Electrochemical Examination of a System Based on Methylviologen and 5,10

Shelepin et al, "Electrochromism of Organic Compounds I. Electrochemical and Spectral Properties of a System Based on Methylviologen and 3

Primary Examiner—Robert L. Stoll
Assistant Examiner—Philip Tucker
Attorney, Agent, or Firm—Price, Heneveld, Cooper, DeWitt & Litton

[57] ABSTRACT

The specification discloses electrochemichromic solutions and devices based on the use of from about 0.5 percent by volume of at least one linear polyether which is soluble in the electrochemichromic solution to reduce segregation without unduly affecting leakage current.

25 Claims, 2 Drawing Sheets

THE EFFECT OF VISCOSITY ON LEAKAGE CURRENT
POLYETHYLENE OXIDE(PEO) THICKENER IN 3-HYDROXYPROPIONITRILE(HPN)

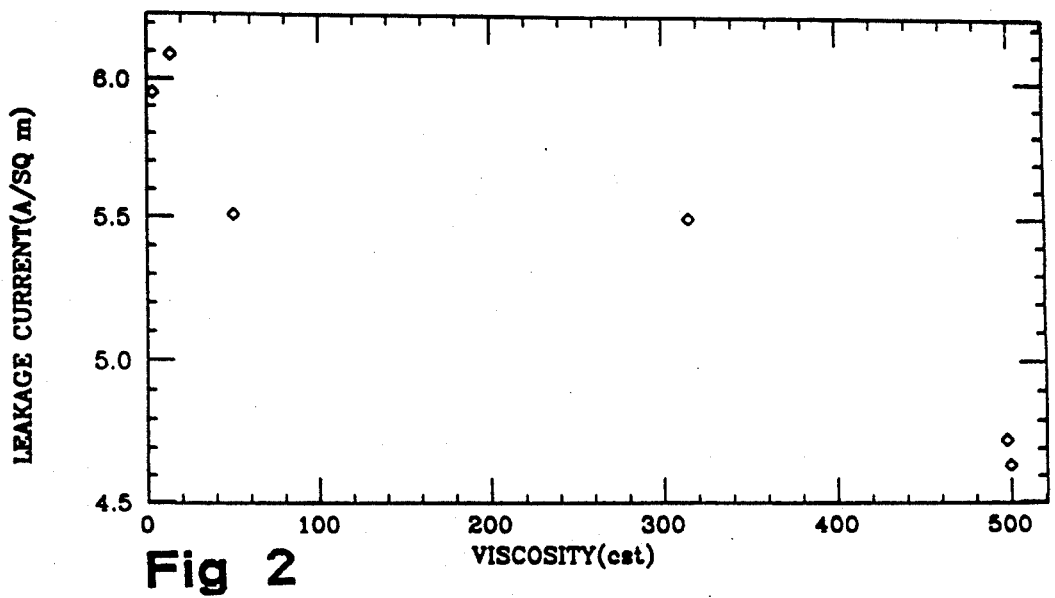
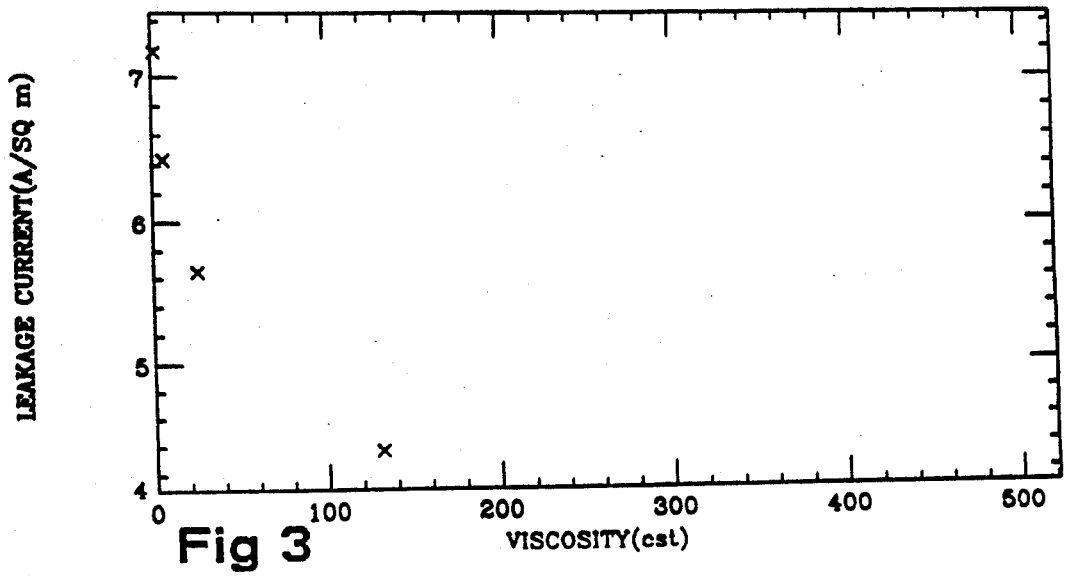

LINEAR POLYETHER-CONTAINING ELECTROCHEMICHROMIC SOLUTIONS AND RELATED DEVICES

BACKGROUND OF THE INVENTION

The present invention relates to electrochemichromic solutions and devices based thereon. Such solutions are well-known and are designed to either color or clear, depending on desired application, under the influence of applied voltage.

Such devices have been suggested for use as rearview mirrors in automobiles such that in night driving conditions, application of a voltage would darken a solution contained in a cell incorporated into the mirror (U.S. Pat. No. 3,280,701, Oct. 25, 1966). Similarly, it has been suggested that windows incorporating such cells could be darkened to block out sunlight, and then allowed to lighten again at night. Electrochemichromic cells have been used as display devices and have been suggested for use as antidazzle and fog-penetrating devices in conjunction with motor vehicle headlamps (British Patent Specification 328017, May 15, 1930).

U.S. Pat. No. 4,090,782 to Bredfeldt et al, U.S. Pat. No. 4,752,119 to Ueno et al (Jun. 1988), Chemical Abstract 86:196871c, 72-Electro. Chemistry, Vol. 86, 1977, I.V. Shelepin et al in *Electrokhimya*, 13(3), 404–408 (Mar. 1977), O. A. Ushakov et al, *Electrokhimya*, 14(2), 319–322 (Feb. 1978), U.S.S.R. Patent 566863 to Shelepin (Aug. 1977), U.S. Pat. No. 3,451,741 to Manos, European Patent Publication 240,226 published Oct. 7, 1987 to Byker, U.S. Pat. No. 4,902,108 to Byker, U.S. Pat. No. 3,806,229 to Schoot et al, U.S. Pat. No. 4,093,358 to Shattuck et al, European Patent Publication 0012419 published June 25, 1980 to Shattuck and U.S. Pat. No. 4,139,276 to Clecak et al all disclose electrochemichromic solutions of anodic and cathodic electrochromically coloring components which provide self-erasing, high color contrast, single compartment cells. Such anodic and cathodic coloring components comprise redox couples selected to exhibit the following reaction:

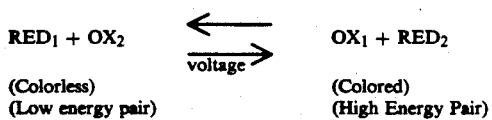

$$RED_1 + OX_2 \;\underset{voltage}{\overset{\longleftarrow}{\longrightarrow}}\; OX_1 + RED_2$$

(Colorless) (Colored)
(Low energy pair) (High Energy Pair)

The redox couple is selected such that the equilibrium position of the mixture thereof lies completely to the left of the equation. At rest potential, the anodically coloring reductant species $RED_1$, and the cathodically coloring oxidant species $OX_2$ are colorless. To cause a color change, voltage is applied and the normally colorless $RED_1$ is anodically oxidized to its colored antipode $OX_1$, while, simultaneously, $OX_2$ is cathodically reduced to its colored antipode, $RED_2$. These cathodic/anodic reactions occur preferentially at the electrodes which, in practical devices, are typically transparent conductive electrodes. Within the bulk of the solution, the redox potentials are such that when $RED_2$ and $OX_1$ come together, they revert to their lower energy form.

This means the applied potential need only suffice to drive the above reaction to the right. On removing the potential, the system reverts to its low energy state and the cell spontaneously self-erases.

Such redox pairs are placed in solution in an inert solvent. Typically, an electrolyte is also added. This solution is then placed into a relatively thin cell, between two conductive surfaces. In most applications, at least one of the conductive surfaces comprises a very thin layer of a transparent conductor such as indium tin oxide (ITO), doped tin oxide or doped zinc oxide deposited on a glass substrate so that the cell is transparent from at least one side. If the device is to be used in a mirror, the second surface is typically defined by a relatively thin layer of transparent conductor such as indium tin oxide, doped tin oxide or doped zinc oxide deposited on another glass substrate, which is silvered or aluminized or otherwise reflector coated on its opposite side. In the case of solar control windows, the second glass substrate would of course not be silvered on its opposite side so that when the redox pair is colorless, the window would be entirely transparent.

A known disadvantage of single-compartment, solution-phase, self-erasing electrochromic devices is exhibited whenever such a device is colored for an extended period of time, sometimes for as short as 60 seconds but more usually over several minutes or hours. When first bleached by removal of the electrical energy after prolonged operation or coloration, bleaching in the device is often non-uniform. Bands of color remain adjacent to the electrically conductive bus bars due to voltage gradient induced segregation, a phenomenon related to the depth of coloration which is a function of applied electrical potential. The resultant potential gradient induces diffusion of charged molecules resulting in increased concentration of colored species adjacent the bus bars.

Differences in solubilities between the colored and uncolored forms of any of the electrochromic species may also contribute to segregation. This form of segregation is particularly noticeable in electrochemichromic devices whose major plane is non-horizontal when in use such as is experienced with rearview mirrors on automobiles, wall mirrors, building windows, automotive front, rear and side windows and the like. In their colored form, either or both of the electrochemichromically active species may fully or partially come out of solution, and dependent on their density relative to that of the host solvent, may float or sink.

The effects of coloration segregation in electrochromic devices have both cosmetic and functional disadvantages. Bands of colors seen after extended coloration can be aesthetically displeasing in devices such as rearview mirrors, windows, office partitions, information displays and the like where users may question whether the device is damaged or working properly. In information display devices where regions of the device are colored while immediately adjacent regions remain uncolored, the functionality of such devices can be impaired because diffusion of colored molecules into adjacent uncolored regions reduces or eliminates lines of demarcation and thus information definition. While this can occur even during the period of prolonged operation, it is particularly evident upon first bleaching after such a period of extended use. To date, these segregation effects have limited the usefulness and commercial success of many electrochromic devices.

Another problem associated with electrochemichromic devices relates to consumer or user safety. Electrochemichromic solutions typically use chemicals of potential consumer or user risk from eye irritation, skin irritation, oral ingestion or the like. Also, these solutions are typically sandwiched between glass elements.

Should these glass elements shatter upon impact in an accident, a consumer or user could be exposed to potential risk due to scattering of glass shards, splashing or spillage of electrochemichromic solution or the like. Also, even where the glass elements merely crack during normal usage, such that the electrochemichromic solution held therebetween simply oozes out to the exterior, a potential user contact hazard exists and, further, because such electrochemichromic solutions typically utilize organic solvents, surfaces such as automobile painted body work adjacent or in contact with the electrochemichromic device may suffer damage.

Yet another problem encountered in electrochemichromic devices relates to current leakage. When the electrochemichromic cell is colored by the application of voltage, the colored species $OX_1$ and $RED_2$ continually want to recombine and return to their equilibrium, colorless condition. The rate of recombination of the colored species $OX_1$ and $RED_2$ within the bulk of the solution is directly proportional to their diffusion coefficient in the solvent used. In order to compensate for the tendency of the colored species to recombine and go to the colorless equilibrium state, current must continually leak into the electrochemichromic solution via the conductive electrodes that typically sandwich said solution.

Because current must flow across the conductive surface of the transparent conductor used on at least one of the substrates that sandwich the electrochemichromic cell, and because these transparent conductors have finite sheet resistance, applied potential will be highest adjacent to the bus bar connector typically located at an edge perimeter and will be lowest near the center of the device as current passes across the conductive glass surface to color remote regions. Thus, if the leakage current is high and/or the sheet resistance of the transparent conductor is high, the potential drop that ensues across the transparent conductor itself results in a lower potential being applied to remote regions. Coloration is therefore non-uniform with the edge regions nearest the bus bar coloring deepest and the central regions coloring lightest.

If the leakage current is low due to a low rate of recombination of the colored species $OX_1$ and $RED_2$ within the bulk of the solution, deep coloring devices are facilitated and coloration uniformity is enhanced. However, bleach rate, which is the time taken to return from the full or partial colored state to the substantially clear, uncolored state, for low leakage current devices can be slow. Thus, it is advantageous when formulating an electrochemichromic solution to design the leakage current to achieve the commercially desired balance between depth of coloration, coloration uniformity and bleach rate. Also, it is desirable to reduce segregation effects by thickening the solution and to enhance safety and product protection by increasing solution viscosity. However, addition of prior art thickening agents such as acrylic polymers to the prior art solvents or the like, while effective in increasing solution viscosity such that anti-segregation and safety benefits are realized, has the disadvantage of lowering the leakage current of the selected formulation with a concomitant slowing of the device bleach rate. Thus, formulation to a desired device and safety performance is complicated.

Problems such as these have contributed to the failure of electrochemichromic solutions and devices based thereon to achieve the degree of commercial success which they potentially could achieve.

SUMMARY OF THE INVENTION

In the present invention, we have discovered that the addition of linear polyethers such as polyethylene oxide to electrochemichromic solutions increases solution viscosity and is effective in reducing the diffusion controlled segregation without, surprisingly, unduly affecting leakage current values. This is unexpected since the addition of prior art thickeners, especially polymeric thickeners, not only results in an increase in solution viscosity and in reducing the diffusion controlled segregation, but also generally results in a decrease in leakage current, accompanied by a decrease in bleach rate. Thus, the addition of linear polyethers to electrochemichromic solutions enables the formulator to mix the electrochemichromic solutions to a desired viscosity without adversely affecting the leakage current and, in turn, the bleach speed. Also, addition of linear polyethers to electrochemichromic solutions improves the safety performance because of the increased viscosity of the solutions.

BRIEF DESCRIPTION OF THE DRAWINGS

FIG. 2 is a graph of leakage current ($Amps/m^2$) versus thickened solution viscosity using polyethylene oxide as the thickener; and FIG. 3 is a graph of leakage current ($Amps/m^2$) versus thickened solution viscosity using polymethylmethacrylate as the thickener.

DESCRIPTION OF THE PREFERRED EMBODIMENT

Figure 1:
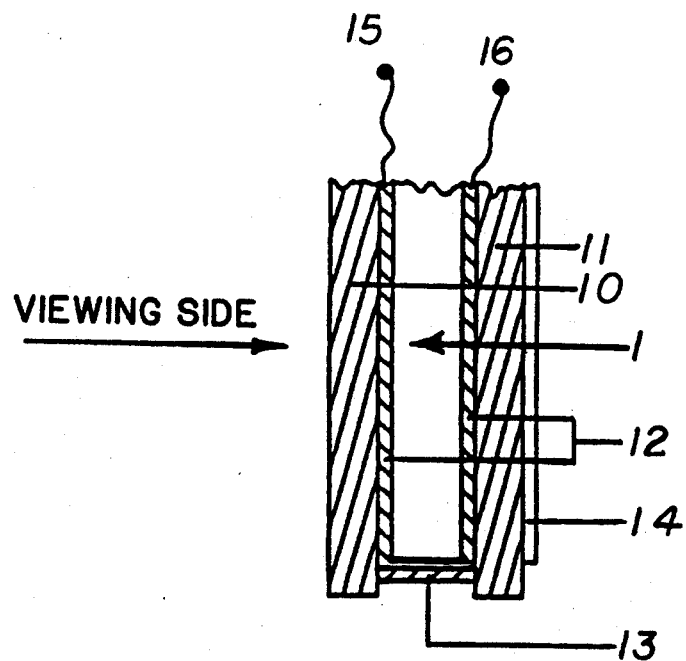
FIG. 1 is a cross-sectional view of an electrochemichromic cell.

In the preferred embodiment, the electrochemichromic solutions of the present invention include a redox chemical pair which colors in the presence of an applied voltage and which bleaches to a colorless condition in the absence of an applied voltage dissolved in an electrochemichromic solvent system that contains a linear polyether such as polyethylene oxide which is soluble in the electrochemichromic solvent system.

Introduction

The electrochemichromic solutions of the preferred embodiment can utilize conventional or equivalent redox systems such as the viologens combined with phenazines, diamines or benzidines, dissolved in a suitable solvent or mixture of solvents that are known to be useful as solvents in the electrochemical arts. Such solvents include acetonitrile, dimethylformamide, propylene carbonate, and gamma-butyrolactone. Particularly preferred solvents include: 3-hydroxypropionitrile (HPN), 3,3'-oxydipropionitrile (ODPN), glutaronitrile (GNT), 3-methylsulfolane (MS), 2-methylglutaronitrile (MGNT) and 2-acetylbutyrolactone (ABL) or mixtures thereof in which linear polyethers are sufficiently soluble. Electrolytes may optionally be used.

Viologens are preferred cathodic materials for the redox pair. Methylviologen, ethylviologen, benzylviologen and heptylviologen are all satisfactory, with 0.025 to 0.05 molar solutions of methylviologen and ethylviologen being preferred. Higher concentrations up to the solubility limits are also operable. In the structural formulas set forth below, $X^-$ represents the anion of the viologen salt. Various anions are disclosed in the literature, though we have discovered that the most preferred anion is hexafluorophosphate ($PF_6^-$) because it surprisingly enhances viologen solubility. This preferred embodiment is the subject of a copending U.S. patent application entitled ELECTROCHEMICHROMIC VIOLOGENS.

is a tetrabutylammonium hexafluorophosphate. We prefer a 0.025 molar solution.

UV stabilizers such as Uvinul TM 400 at approximately 5% weight by volume or greater depending on the solubility limit can also be used in the solutions of the present invention.

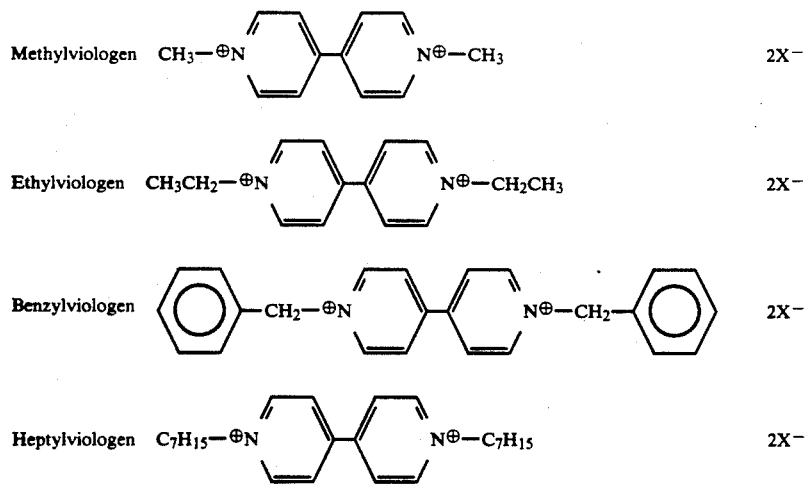

Hexafluorophosphate counter ion is listed below with other acceptable, though less preferred, counter ions for use on the viologens:

| | |
|---|---|
| Tetrafluoroborate | BF4− |
| Perchlorate | ClO4− |
| Trifluoromethane sulfonate | CF3SO3− |
| Hexafluorophosphate | PF6− |

The preferred anodic coloring materials are set forth below:

Substantially any linear polyether which is soluble in the electrochemichromic solutions can be employed in the practice of the invention. Particularly preferred linear polyethers include those of the polyethylene oxide type, which preferably range in molecular weights from about 100,000 to about 4,000,000. The linear polyethers will normally be used in the range from 0.5 to 10% (w/v), based on total volume of the unthickened electrochemichromic solution. Preferably,

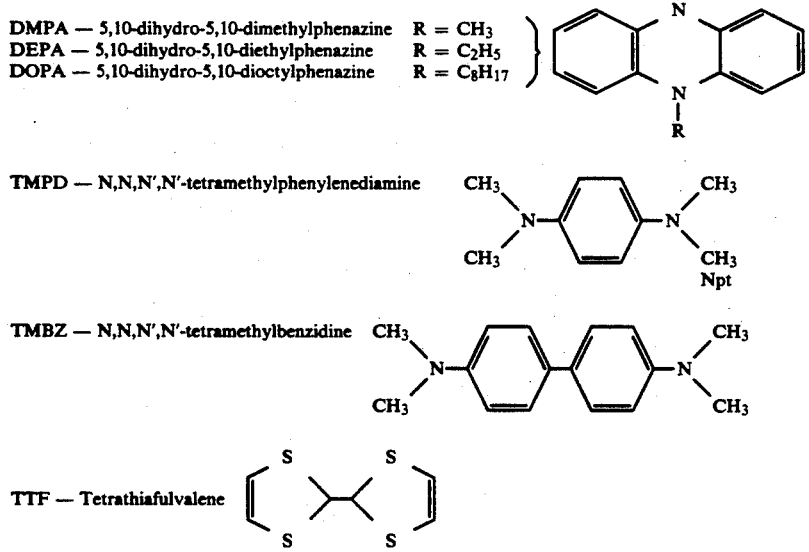

Most preferred is a 0.025 molar solution of 5,10-dihydro-5,10-dimethylphenazine (DMPA).

Numerous electrolytes can be used in the present invention. One which is often suggested for electrochemichromic cells and which is acceptable in accordance with the preferred embodiment of the invention the amount of linear polyether should be such as to provide a thickened solution having a viscosity at 25° C. of not more than 600 centistokes for optimum vacuum backfilling results. Suitable linear polyethers are characterized as those polymers in which the repeating units of the polymer backbone are non-cyclic and are linked by carbon to oxygen to carbon bonds (—C—O—C—) and include polyethylene oxides, polypropylene oxides, poly(ethylene oxide-propylene oxide) copolymers and polytetramethylene oxides in which the linear repeating units are connected by the ether linkages (—C—O—C—), and mixtures thereof.

The best mode electrochemichromic solution contemplated for practicing the invention comprises at least one of the previously described solvents, containing 0.025 molar ethylviologen hexafluorophosphate, 0.025 molar tetrabutylammonium hexafluorophosphate, 0.025 molar 5,10-dihydro-5,10-dimethylphenazine (DMPA) and 0.5-10% (w/v) of polyethylene oxide having a weight average molecular weight from about 100,000 to 4,000,000, with little variation in function being noted based on variations in molecular weight.

FIG. 1 illustrates a typical electrochemichromic cell 1 into which solutions of the present invention are typically filled. Cell 1 comprises a pair of glass plates 10 and 11 each coated on its inwardly facing surface with a half wave indium tin oxide (ITO) coating 12 of about 15 ohms/square sheet resistance. Plates 10 and 11 are separated by peripheral seal 13 so that the interior of the cell has a thickness of 150 microns. Cell 1 is sealed at its perimeter by peripheral seal 13. Seal 13 comprises an epoxy material, to which 150 micron diameter spacers are added, and silk-screened to a thickness of about 150 microns. Glass beads are used as spacers. As shown, cell 1 is intended to be used as a mirror, and thus the rear surface of glass plate 11 is coated with a silver reflector layer 14. If the device were used as a window, layer 14 would be deleted. The conductive indium tin oxide layers 12 are connected to electrical terminals 15 and 16 so that a voltage can be established across a solution located between plates 10 and 11 in cell 1.

The surprising effect of linear polyethers in their relatively low impact on current leakage can be seen by comparing solutions containing polyethylene oxide to solutions using the prior art thickener polymethyl methacrylate (PMMA). FIGS. 2 and 3 are graphs of leakage current (Amps/$m^2$) versus thickened solution viscosity. The unthickened electrochemichromic solution comprised:

| | |
|---|---|
| 0.025M | ethylviologen hexafluorophosphate |
| 0.025M | 5,10-dimethyl-5,10-dihydrophenazine |
| 0.025M | tetrabutylammonium hexaflurophosphate | dissolved in 3-hydroxypropionitrile (HPN). As formulated, and as used in an electrochemichromic device as described above, and as illustrated in FIG. 1, viscosity of the unthickened solution was 3.5 centistokes (cst) and leakage current was 6 A/$m^2$. As shown by the diamond icons on FIG. 2, and tabulated in Table 1, the leakage current remained substantially unaffected in spite of addition of 2% wt/vol 600,000 molecular weight PEO such that solution viscosity rose to 315 centistokes. By comparison to a prior art thickener, FIG. 3 is a graph of leakage current in amperes per square meter (A/$m^2$) versus thickened solution viscosity for a formulation comprising:

| | |
|---|---|
| 0.025M | methylviologen perchlorate |
| 0.025M | 5,10-dimethyl-5,10-dihydropenazine |
| 0.025M | tetraethylammonium perchlorate | dissolved in propylene carbonate and thickened with varying concentrations of polymethylmethacrylate (90,000 molecular weight). As shown by the star icons on FIG. 3 and as tabulated in Table 1, leakage current falls rapidly with even a modest increase in viscosity. For example, an increase in viscosity from 2 cst to 132 cst reduces leakage current from 7.2 A/$m^2$ to 4.4 A/$m^2$.

The leakage current data set forth herein was determined using electrochemichromic cell 1 (FIG. 1) with its rear surface mirrored as indicated above.

The leakage current data set forth in Table 1 below was obtained by placing the various electrochemichromic solutions included in Table 1 within the 150 micron space between cell 1. Viscosity was determined at room temperature (25° C.) using a conventional viscometer and test method. Indium-tin oxide transparent conductor coatings of 15 ohms/square sheet resistance were used on the inwardly facing surfaces of the glass substrates that sandwiched the electrochemichromic solution. The mirror area in cell 1 was about 110 $cm^2$ for these measurements. Each solution comprises either 0.025 molar methylviologen perchlorate (MVClO$_4$) or 0.025 molar ethylviologen hexafluorophosphate (EVPF$_6$) as the cathodic coloring material, 0.025 molar 5,10-dihydro-5,10-dimethylphenazine as the anodic coloring material and 0.025 molar tetraethylammonium perchlorate or tetrabutylammonium hexafluorophosphate as the electrolyte. The solvent was then varied in the manner set forth in column 1 in Table 1.

Column 1 in Table 1 lists the solvents and the thickener added. Column 2 lists the viologen used. Column 3 lists the concentration of thickener added in percent weight per volume. Percent wt/vol is the weight of thickener in grams dissolved in 100 mls of solvent. For example, a 1% wt/vol solution of polyethylene oxide in 3-hydroxypropionitrile (HPN) is formed by adding 1.0 gram of polyethylene oxide to 100 mls of 3-hydroxypropionitrile. Column 4 gives the % reflectivity at zero applied potential as measured at the center of the electrochemichromic mirror device using a conventional reflectivity measurement means. Column 5 is the % reflectivity reached when a potential of 1 volt is applied to fully color these solutions. Column 6 lists the speeds of coloration, i.e., the time within which the reflectivity dropped from 70% to 20% when a potential 1 volt is applied. Column 7 lists the speeds of bleach, i.e., time required to increase the reflectivity from 10% to 60% when zero potential is applied. Column 8 is the leakage current in amperes per square meter of cell area when electrochemichromic solutions are filled into cell 1 as described above and when fully colored under 1 volt applied potential. Column 9 is the solution viscosity, in centistokes.

TABLE 1

| Solvent & Thickener | Viologen | % Wt/Vol | Clear State % Refl. | Colored State % Refl. | Coloration Speed 70%–20% Seconds | Bleach Speed 10%–60% Seconds | Leakage Current A/$M^2$ | Viscosity 25° C. Centistokes |
|---|---|---|---|---|---|---|---|---|
| PC | MVClO$_4$ | 0% | 80.0 | 8.1 | 4.5 | 4.8 | 7.18 | 2.0 |
| PC + PMMA | MVClO$_4$ | 5% | 80.0 | 7.3 | 3.9 | 5.2 | 6.44 | 6.4 |

TABLE 1-continued

| Solvent & Thickener | Viologen | % Wt/Vol | Clear State % Refl. | Colored State % Refl. | Coloration Speed 70%-20% Seconds | Bleach Speed 10%-60% Seconds | Leakage Current A/M$^2$ | Viscosity 25° C. Centistokes |
|---|---|---|---|---|---|---|---|---|
| | MVClO$_4$ | 10% | 80.8 | 6.9 | 4.3 | 6.0 | 5.65 | 25.3 |
| | MVClO$_4$ | 15% | 81.2 | 6.9 | 3.9 | 8.9 | 4.37 | 131.7 |
| | MVBF$_4$ | 25% | 62.5 | 6.2 | 4.2 | 8.6 | 3.0 | 1850 |
| HPN | EVPF$_6$ | 0% | 82.2 | 7.0 | 4.5 | 5.2 | 5.95 | 3.5 |
| HPN + PEO$^a$ | EVPF$_6$ | 2% | 73.6 | 6.7 | 3.3 | 5.5 | 6.09 | 13.8 |
| | EVPF$_6$ | 5% | 76.4 | 6.2 | 4.0 | 6.8 | 5.51 | 50.4 |
| | EVPF$_6$ | 10% | 76.6 | 5.7 | 3.9 | 9.5 | 4.64 | 500 |
| HPN + PEO$^b$ | EVPF$_6$ | 2% | 75.3 | 6.4 | 3.6 | 5.9 | 5.51 | 315 |
| HPN + PEO$^c$ | EVPF$_6$ | 1% | 74.8 | 6.2 | 4.3 | 6.0 | 4.73 | 498 |
| HPN | MVClO$_4$ | 0% | 83.3 | 8.2 | 3.7 | 5.4 | 6.73 | 3.5 |
| HPN + PEO$^c$ | MVClO$_4$ | 1% | 79.0 | 7.3 | 4.5 | 5.8 | 5.9 | 498 |
| HPN/GNT$^d$ | MVClO$_4$ | 0% | 83.5 | 7.7 | 4.4 | 4.5 | 5.2 | 4.1 |
| HPN/GNT + PEO$^c$ | MVClO$_4$ | 1% | 82.0 | 7.0 | 4.1 | 7.0 | 4.8 | 312 |
| HPN/ODPN$^e$ | MVClO$_4$ | 0% | 83.0 | 6.8 | 4.2 | 5.9 | 5.5 | 4.7 |
| HPN/ODPN + OEO$^c$ | MVClO$_4$ | 1% | 80.0 | 6.3 | 3.6 | 8.6 | 5.3 | 521 |
| GNT | MVClO$_4$ | 0% | 78.0 | 7.7 | 3.7 | 11.6 | 3.8 | 5.9 |
| GNT + PEO$^c$ | MVClO$_4$ | 1 | 78.9 | 7.7 | 3.4 | 9.4 | 3.3 | 295 |

$^a$ = Polyethyleneoxide; 100,000 mol. wt.
$^b$ = Polyethyleneoxide; 600,000 mol. wt.
$^c$ = Polyethyleneoixde; 4,000,000 mol. wt.
$^d$ = HPN/GNT 50/50 (v/v)
$^e$ = HPN/ODPN 50/50 (v/v)
PEO = Polyethylene Oxide
PC = Propylene Carbonate
HPN = 3-Hydroxypropionitrile
PMMA = Polymethylmethacrylate-Aldrich, Medium Molecular Weight
ODPN = 3,3'-Oxydipropionitrile
ClO$_4$ = Perchlorate
PF$_6$ = Hexafluorophosphate
% wt/vol = Wt (grams) of PEO or PMMA dissolved in 100 mls of solvent
GNT = Glutaronitrile
BF$_4$ = Tetrafluoroborate In Table 1, data are reported for solutions based on the solvents propylene carbonate, 3-hydroxypropionitrile, glutaronitrile and 1:1 (v/v) mixtures of 3-hydroxypropionitrile with 3.3'-oxydipropionitrile and glutaronitrile. The propylene carbonate solution was thickened with 5, 10, 15 and 25% weight/volume polymethylmethacrylate. 3-Hydroxypropionitrile which is one of the solvents disclosed in copending patent application Ser. No. 07/443,113 entitled HIGH PERFORMANCE ELECTROCHEMICHROMIC SOLUTIONS AND DEVICES THEREOF, was thickened with 1, 2, 5, and 10% weight/volume of polyethylene oxide of mol. wts. ranging from 100,000 to 4,000,000. Also included in the Table 1 are the solutions comprising HPN/ODPN and HPN/GNT (1:1 v/v) which are thickened with 1% w/v of PEO having 4,000,000 mol. wt.

As can be seen from the data (column 9), the addition of polymethylmethacrylate and polyethylene oxide to electrochemichromic solutions results in an increase in solution viscosity. Leakage current for unthickened propylene carbonate and 3-hydroxypropionitrile is 7.18 A/m$^2$ and 6.73 A/m$^2$, respectively, using methylviologen perchlorate. The data also show that as one adds polymethylmethacrylate to thicken electrochemichromic solutions to overcome segregation effects and to achieve safety benefit, leakage current decreases dramatically in comparison to the significantly smaller decrease in leakage current which results from the addition of linear polyethers such as polyethyleneoxide, even though the use of these linear polyether thickeners results in a more viscous solution. For example, a 15% PMMA solution of 132 cst viscosity in PC has a 4.37 A/m$^2$ (down about 40% from 7.18 A/m$^2$ for pure PC) whereas a 1% by weight PEO solution in HPN of greater viscosity (498 cst) has a leakage current of 5.9 A/m$^2$ which is only about 12% down from pure HPN (6.73 A/m$^2$).

A similar trend was exhibited by the solutions containing ethylviologen and polyethylene oxide having molecular weight ranging from 100,000-4,000,000. For example, the solutions containing 100,000 mol. wt. (10% w/v and 500 cst) and 600,000 mol. wt. (2% w/v and 315 cst viscosity) PEO have leakage current of 4.64 A/m$^2$ and 5.51 A/m$^2$, respectively, which is only about 22% down from pure HPN (6 A/m$^2$) containing EVPF$_6$. The ability to thicken the solution without unduly decreasing leakage current is beneficial because as indicated in the data in Column 7, Table 1, a decrease in leakage current is typically accompanied by an increase in the time required to bleach the mirror. The ability to set the leakage current and also the bleach speed of a given device to desired values and then optionally thicken the solution used therein so as not to unduly disturb the selected leakage current and bleach speed is also beneficial.

Of course, it is understood that the above is merely a preferred embodiment of the invention and that various changes and alterations can be made without departing from the spirit and broader aspects thereof.

The embodiments of the invention in which an exclusive property or privilege is claimed are defined as follows:

1. An electrochemichromic solution comprising:
 a solvent;
 a redox chemical pair in solution in said solvent which colors in the presence of an applied voltage and which bleaches to a colorless condition in the absence of an applied voltage;
 said solvent thickened by addition of an effective amount of at least one linear polyether.

2. The electrochemichromic solution of claim 1 in which said linear polyether has a molecular weight in the range from 100,000 to 4,000,000.

3. The electrochemichromic solution of claim 1 in which the viscosity of said electrochemichromic solution is not greater than 600 centistokes at 25° C.

4. The electrochemichromic solution of claim 1 in which said linear polyether comprises polyethylene oxide and said solvent is thickened by addition of 0.5 to 10 percent weight by volume of polyethylene oxide.

5. The electrochemichromic solution of claim 4 in which said solvent includes as a substantial component at least one material selected from the group consisting of 3-hydroxypropionitrile, 2-acetylbutyrolactone, glutaronitrile, 3,3'-oxydipropionitrile, 3-methylsulfolane, 2-methylglutaronitrile, propylene carbonate and mixtures thereof.

6. The electrochemichromic solution of claim 5 in which the viscosity of said electrochemichromic solution is not greater than 600 centistokes at 25° C.

7. The electrochemichromic solution of claim 1 in which said solvent includes as a substantial component at least one material selected from the group consisting of 3-hydroxypropionitrile, 2-acetylbutyrolactone, glutaronitrile, 3,3'-oxydipropionitrile, 3-methylsulfolane, 2-methylglutaronitrile, propylene carbonate and mixtures thereof.

8. The electrochemichromic solution of claim 7 in which the viscosity of said electrochemichromic solution is not greater than 600 centistokes at 25° C.

9. The electrochemichromic solution of claim 1 in which said redox chemical pair comprises 0.025 to 0.05 molar of one of methylviologen and ethylviologen and 0.025 to 0.05 molar 5,10-dihydro-5,10-dimethylphenazine.

10. An electrochemichromic cell comprising:
spaced plates, each having an inwardly facing conductive surface;
an electrochemichromic solution located in said cell between said inwardly facing conductive surfaces, said solution comprising:
a solvent;
a redox chemical pair in solution in said solvent which colors in the presence of an applied voltage and which bleaches to a colorless condition in the absence of an applied voltage;
said solvent thickened by addition of at least one linear polyether which is soluble in said solvent.

11. An electrochemichromic cell of claim 10 in which said linear polyether has a molecular weight in the range from 100,000 to 4,000,000.

12. An electrochemichromic cell of claim 10 in which the viscosity of said electrochemichromic solution is not greater than 600 centistokes at 25° C.

13. An electrochemichromic cell of claim 10 in which said linear polyether comprises polyethylene oxide and said solvent is thickened by addition of 0.5 to 10 percent weight by volume of polyethylene oxide.

14. An electrochemichromic cell of claim 13 in which said solvent additionally comprises one of the group consisting of propylene carbonate, 3-hydroxypropionitrile, 2-acetylbutyrolactone, glutaronitrile, 3,3'-oxydipropionitrile, 3-methylsulfolane, 2-methylglutaronitrile and mixtures thereof.

15. An electrochemichromic cell in accordance with claim 14 wherein the viscosity of said electrochemichromic solution is not greater than 600 centistokes at 25° C.

16. The electrochemichromic solution of claim 10 in which said redox chemical pair comprises 0.025 to 0.05 molar of one of methylviologen and ethylviologen and 0.025 to 0.05 molar 5,10-dihydro-5,10-dimethylphenazine.

17. An electrochemichromic solution comprising:
a solvent;
a redox chemical pair in solution in said solvent which colors in the presence of an applied voltage and which bleaches to a colorless condition in the absence of an applied voltage;
said solvent comprising at least 0.5 percent weight by volume of at least one linear polyether having a molecular weight in the range from 100,000 to 4,000,000.

18. The electrochemichromic solution of claim 17 in which the viscosity of said solution is not greater than 600 centistokes at 25° C.

19. The electrochemichromic solution of claim 18 in which said solvent comprises one of the group consisting of propylene carbonate, 3-hydroxypropionitrile, 2-acetylbutyrolactone, glutaronitrile, 3,3'-oxydipropionitrile, 3-methylsulfolane, 2-methylglutaronitrile and mixtures thereof.

20. The electrochemichromic solution of claim 19 in which said redox chemical pair comprises 0.025 to 0.05 molar of one of methylviologen and ethylviologen and 0.025 to 0.05 molar 5,10-dihydro-5,10-dimethylphenazine.

21. An electrochemichromic cell comprising:
spaced plates, each having an inwardly facing conductive surface;
an electrochemichromic solution located in said cell between said inwardly facing conductive surfaces, said solution comprising:
a solvent;
a redox chemical pair in solution in said solvent which colors in the presence of an applied voltage and which bleaches to a colorless condition in the absence of an applied voltage;
said solvent thickened by addition of at least one linear polyether having a molecular weight in the range from 100,000 to 4,000,000.

22. The cell of claim 21 in which said linear polyether comprises polyethylene oxide and said solvent is thickened by the addition of 0.5 to 10 percent weight by volume polyethylene oxide.

23. The cell of claim 22 in which said solvent comprises one of the group consisting essentially of propylene carbonate, glutaronitrile, 3-hydroxypropionitrile, 2-acetylbutyrolactone, 3,3'-oxydipropionitrile, 3-methylsulfolane, 2-methylglutaronitrile and mixtures thereof.

24. The cell of claim 23 in which the viscosity of said solvent is not greater than 600 centistokes at 25° C.

25. The electrochemichromic solution of claim 21 in which said redox chemical pair comprises 0.025 to 0.05 molar of one of methylviologen and ethylviologen and 0.025 to 0.05 molar 5,10-dihydro-5,10-dimethylphenazine.

* * * * *

UNITED STATES PATENT AND TRADEMARK OFFICE
CERTIFICATE OF CORRECTION

PATENT NO. : 5,145,609
DATED : September 8, 1992
INVENTOR(S) : Varaprasad et al.

It is certified that error appears in the above-identified patent and that said Letters Patent is hereby corrected as shown below:

Column 9, Line 10 (under heading "Solvent & Thickener":

"$OEO^C$" should be --$PEO^C$--

Signed and Sealed this

Twenty-first Day of December, 1993

Attest:

BRUCE LEHMAN

Attesting Officer     Commissioner of Patents and Trademarks